United States Patent
Sormani et al.

(10) Patent No.: US 6,875,514 B2
(45) Date of Patent: Apr. 5, 2005

(54) COATING COMPOSITION CONTAINING POLYTRIMETHYLENE ETHER DIOL USEFUL AS A PRIMER COMPOSITION

(75) Inventors: Patricia Mary Ellen Sormani, Newark, DE (US); Hari Babu Sunkara, Hockessin, DE (US); James William O'Neil, Chadds Ford, PA (US); Joseph V. Kurian, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/393,754

(22) Filed: Mar. 21, 2003

(65) Prior Publication Data

US 2004/0185263 A1 Sep. 23, 2004

(51) Int. Cl.[7] ............................................. C08L 75/08
(52) U.S. Cl. ............................. 428/423.1; 428/423.3; 156/94; 528/306; 525/460; 427/409; 427/408.1
(58) Field of Search .......................... 156/94; 528/306; 525/460; 428/423.1, 423.3; 427/409, 407.1

(56) References Cited

U.S. PATENT DOCUMENTS

| | | | |
|---|---|---|---|
| 3,326,985 A | * | 6/1967 | Mason ........................ 568/621 |
| 4,591,533 A | | 5/1986 | Antonelli et al. |
| 5,010,140 A | | 4/1991 | Antonelli et al. |
| 5,596,043 A | * | 1/1997 | Harris et al. ................. 525/127 |
| 5,633,362 A | | 5/1997 | Nagarajan et al. |
| 5,686,276 A | | 11/1997 | Laffend et al. |
| 5,763,528 A | | 6/1998 | Barsotti et al. |
| 5,821,092 A | | 10/1998 | Nagarajan et al. |
| 6,210,758 B1 | | 4/2001 | McNeil et al. |
| 6,221,494 B1 | * | 4/2001 | Barsotti et al. .......... 428/423.1 |
| 6,441,087 B1 | * | 8/2002 | Zhou et al. .................. 524/590 |
| 2002/0007043 A1 | | 1/2002 | Sunkara et al. |
| 2002/0010374 A1 | | 1/2002 | Sunkara et al. |
| 2004/0030060 A1 | * | 2/2004 | Sunkara et al. ............. 525/453 |

* cited by examiner

Primary Examiner—D. Lawrence Tarazano
(74) Attorney, Agent, or Firm—Steven C. Benjamin

(57) ABSTRACT

A coating composition comprising a film forming binder of
  a. an acrylic polymer having pendant groups that are reactive with isocyanate moieties and having a glass transition temperature (Tg) of 10 to 80°C.;
  b. a polytrimethylene ether diol having a Mn (number average molecular weight) of 500 to 5,000; and
  c. an organic polyisocyanate crosslinking agent;
wherein the coating composition contains pigments and cures at ambient temperatures or elevated temperatures and forms a coating that is sandable and when used in combination with a top coat, for example, a colored base coat and clear coat or a pigmented mono-coat forms a chip resistant multi-layer coating useful for refinishing or repairing automotive and truck bodies and parts.

34 Claims, No Drawings

COATING COMPOSITION CONTAINING POLYTRIMETHYLENE ETHER DIOL USEFUL AS A PRIMER COMPOSITION

BACKGROUND OF THE INVENTION

1. Field of the Invention

This invention is directed to a coating composition, in particular, to a coating composition useful as a primer, a primer surfacer or a primer filler having excellent chip resistance and good sandability.

2. Description of the Prior Art

To meet the many requirements of an exterior finish for automobiles, the automotive industry currently is using multi-layer finishes on automobile and truck bodies and parts. Typical of these finishes are layers of the following: (1) an electrocoat layer applied over a substrate, typically, a phosphatized cold rolled steel, (2) a primer layer, (3) a colored layer, typically pigmented, and (4) a clear layer. A colored top-coat layer may be used in place of the colored layer and clear layer. On repairing or refinishing such multi-layer finishes, a suitable primer, primer surfacer or primer filler coating is applied over the multi-layer finish that usually is sanded thereby exposing one or more layers or is applied over a filler material that has been used to fill in surface imperfections. This primer, primer surfacer or primer filler, herein after, "primer", has many requirements. It must have adhesion to the substrate and provide a surface to which the colored layer or top-coat will adhere. It must be readily sandable in a reasonably short period of time after application, for example, about three hours after application. It must provide the resulting multi-layer finish with good impact resistance, in particular, stone chip resistance.

For a primer to exhibit the above properties, the cured primer layer should have high flexibility at low temperatures combined with high hardness under low stress conditions. In general, soft primers that have a high degree of flexibility and chip resistance, have poor sandability due to their rubber like nature and hence, cannot be processed rapidly in an auto refinish operation, which results in lowered productivity. If a primer is used that can be readily sanded after a very short drying time, it generally is hard and has poor flexibility and chip resistance. That problem has been partially overcome by using activated base coats to improve the chip resistance of the resulting multi-layer finish. However, this further complicates the refinishing process with the use of another reactive coating that has a limited "pot life".

There are several primer compositions that can be used. For example, Barsotti, et al. U.S. Pat. No. 6,221,494, teaches the use of a solvent based ambient temperature curable high solids urethane coating useful for refinishing automobile and truck bodies and parts. Harris, et al. U.S. Pat. No. 5,596,043 shows a powder coating composition containing urethane and acrylic resins useful for coating that have flexibility and stone chipping resistance and McNeil, et al. U.S. Pat. No. 6,210,758 also shows a coating composition of an acrylic polymer, a polyurethane and a crosslinking agent that has improved chip resistance.

It would be very desirable to have a liquid coating composition, in particular, a primer composition, that cures at low temperatures, preferably, ambient temperatures and provides a combination of early hardness with good sandability that in combination with a base-coat and clear-coat forms a multi-layer finish on an automobile or truck body or part that has good stone chip resistance. More particularly, it would be desirable that such a composition contains components that are derived from renewable resources. The novel composition of this invention meets these aforementioned requirements.

SUMMARY OF THE INVENTION

A coating composition comprising a film-forming binder of a. an acrylic polymer having pendant groups that are reactive with isocyanate moieties and having a glass transition temperature (Tg) of 10 to 80° C.;

b. a polytrimethylene ether diol having a Mn (number average molecular weight) of 500 to 5,000; and c. an organic polyisocyanate crosslinking agent;

wherein the coating composition contains pigments and cures at ambient temperatures or elevated temperatures and forms a coating that is sandable and when used in combination with a top coat, for example, a colored base-coat and clear-coat or a pigmented mono-coat, forms a chip resistant multi-layer coating useful for refinishing or repairing automotive and truck bodies and parts.

DETAILED DESCRIPTION OF THE INVENTION

The novel coating composition of this invention preferably is a solvent-borne composition containing a film-forming binder of an acrylic polymer that has pendant groups that are reactive with isocyanate moieties and has a glass transition temperature (Tg) of 10 to 80° C.; a polytrimethylene ether diol having a Mn (number average molecular weight) of 500 to 5,000; an organic polyisocyanate crosslinking agent and the composition generally contains pigment(s). The coating composition is particularly useful as a primer used for refinishing or repairing automobile and truck bodies or parts and has a particular advantage that after a relatively short time after application, it is sufficiently hardened and can be sanded. This composition in combination with a topcoat of a color coat and clear coat or a pigmented mono-coat provides a finish that has improved chip resistance in comparison to conventional commercial primers.

The term "binder" as used herein refers to the film forming constituents of the composition that include the acrylic polymer, polytrimethylene ether diol, and organic isocyanate and other reactive oligomers and/or reactive diluents. Solvents, pigments, catalysts, rheology modifiers, antioxidants, UV stabilizers, leveling agents, antifoaming agents, anti-cratering agents, adhesion promoting agents are not included in the term.

The binder of the composition contains (a) 10 to 80% by weight, preferably 20 to 70% by weight and more preferably, 35 to 55% by weight of the acrylic polymer, (b) 1 to 50% by weight, preferably, 5 to 40% by weight and more preferably, 20 to 30% by weight of polytrimethylene ether diol and (c) 10 to 50% by weight and preferably 15 to 45% by weight and more preferably 20 to 45% by weight of organic polyisocyanate. All weight percentages are based on the total weight of the binder of the coating composition and the sum of the percentages of (a), (b) and (c) is 100%. Preferably, the novel composition has a molar ratio of NCO:OH of 0.8:1.0 to 1.5:1.0, preferably 0.9:1.0 to 1.1:1.0 and more preferably 1.01:1.0 to 1.1:1.0.

The acrylic polymer used in the composition has a weight average molecular weight of about 5,000 to 50,000, a Tg of 10 to 80° C. and contains pendant moieties that are reactive with isocyanate groups, such as, hydroxy, amino, amide, glycidyl, silane and carboxyl groups. The Tg is calculated according to the Fox Equation. Preferably, the acrylic polymer has a weight average molecular weight of 5,000 to 50,000, more preferably, 10,000 to 25,000 and still more preferably, of 14,000 to 17,000. The acrylic polymer has a Tg preferably of greater than 30° C. and up to 80° C. The Tg of the binder when cured is greater than 30° C. Typically useful acrylic polymers are those known in the art and are polymers of the following: linear alkyl(meth)acrylates having 1 to 12 carbon atoms in the alkyl group, cyclic or branched alkyl(meth)acrylates having 3 to 12 carbon atoms in the alkyl group, including isobornyl(meth)acrylate and the polymers can contain styrene, alpha methyl styrene, vinyl toluene, (meth)acrylonitrile, (meth)acryl amides and contains monomers that provide pendant reactive groups, like, hydroxy alkyl(meth)acrylates having 1 to 4 carbon atoms in the alkyl group, glycidyl(meth)acrylate, hydroxy amino alkyl(meth)acrylates having 1 to 4 carbon atoms in the alkyl group, (meth)acrylic acid, alkoxy silyl alkyl(meth)acrylates, such as, trimethoxysilylpropyl(meth)acrylate and the like.

Preferred are hydroxy functional acrylic polymers having a hydroxy equivalent weight (on a solids basis) of 300 to 800, preferably, 380 to 750 and more preferably, 450 to 580 and are polymers of hydroxy alkyl(meth)acrylates and one or more of the aforementioned monomers. The hydroxyl equivalent weight is the grams of resin per equivalent of hydroxyl groups. One preferred hydroxy containing acrylic polymer contains 35 to 40% by weight styrene, 15 to 25% by weight 2-ethylhexyl methacrylate and 15 to 20% by weight isobornyl methacrylate and 20 to 30% by weight hydroxyethyl methacrylate. A particularly preferred acrylic polymer contains 37% styrene, 20% by weight 2-ethylhexyl methacrylate and 17.5% by weight of isobornyl methacrylate and 25.5% by weight hydroxyethyl methacrylate.

The polytrimethylene ether diol used in the coating composition has a number average molecular weight (Mn) in the range of 500 to 5,000, preferably 1,000 to 3,000. The polytrimethylene ether diol has a Tg of about −75° C., a polydispersity in the range of 1.1 to 2.1 and a hydroxyl number in the range of 20 to 200.

The polytrimethylene ether diol is prepared by an acid-catalyzed polycondensation of 1,3-propanediol, preferably, as described in U.S. Published Patent Application Nos. 2002/7043 A1 and 2002/10374 A1, both of which are hereby incorporated by reference. The polytrimethylene ether diol also can be prepared by a ring opening polymerization of a cyclic ether, oxetane, as described in J. Polymer Sci., Polymer Chemistry Ed. 28, 449 to 444 (1985) which is also incorporated by reference. The polycondensation of 1,3-propanediol is preferred over the use of oxetane since the diol is a less hazardous, very stable, low cost, commercially available material and can be prepared by use of petro chemical feed-stocks or renewable resources.

Preferably, a bio-route via fermentation of a renewable resource is used to obtain the 1,3-propanediol. One particularly preferred renewable resource is corn since it is readily available and has a high rate of conversion to 1,3-propanediol and can be genetically modified to improve yields to diol. Typical bio-conversion processes are shown in U.S. Pat. Nos. 5,686,276, 5,633,362 and 5,821,092. U.S. '276 teaches a bio-conversion process of a fermentable carbon source to 1,3-propanediol by a single microorganism. U.S. '362 and U.S. '092 show the bio-conversion of glycerol to 1,3-propanediol by recombinant bacteria harboring a foreign gene encoding a diol dehydratase. The aforementioned patents are incorporated herein by reference.

Copolymers of polytrimethylene ether diol also can be used. For example, such copolymers are prepared by copolymerizing 1,3-propanediol with another diol, such as, ethane diol, hexane diol, 2-methyl-1,3-propanediol, 2,2-dimethyl-1,3-propanediol, trimethylol propane and pentaerythritol. At least 50% of the copolymer must be from 1,3-propanediol.

A blend of a high and low molecular weight polytrimethylene ether diol can be used wherein the high molecular weight diol has an Mn of 1,000 to 4,000 and the low molecular weight diol has an Mn of 150 to 500. The average Mn of the diol should be in the range of 1,000 to 4,000. Also, the diol can contain polytrimethylene ether triols and other higher functionality polytrimethylene ether polyols in an amount of 1 to 20%, by weight, based on the weight of the polytrimethylene ether diol.

Blends of the polytrimethylene ether diol and other cycloaliphatic hydroxyl containing either branched or linear oligomers can be used. Such oligomers are disclosed in Barsotti, et al. U.S. Pat. No. 6,221,494 which is hereby incorporated by reference. Up to 30% by weight, based on the weight of the binder, of such oligomers can be used.

Coatings formed from compositions of this invention containing polytrimethylene ether diols have better chip resistance in comparison to coatings prepared from conventional diols, for example, polytetramethylene ether diols and polyoxypropylene diols.

Typically useful organic polyisocyanate crosslinking agents that can be used in the novel composition of this invention include aliphatic polyisocyanates, cycloaliphatic polyisocyanates, aromatic polyisocyanates and isocyanate adducts.

Examples of suitable aliphatic, cycloaliphatic and aromatic polyisocyanates that can be used include the following: 2,4-toluene diisocyanate, 2,6-toluene diisocyanate ("TDI"), 4,4-diphenylmethane diisocyanate ("MDI"), 4,4'-dicyclohexyl methane diisocyanate, ("H$_{12}$MDI"), 3,3'-dimethyl-4,4'-biphenyl diisocyanate ("TODI"), 1,4-benzene diisocyanate, trans-cyclohexane-1,4diisocyanate, 1,5-naphthalene diisocyanate ("NDI"), 1,6-hexamethylene diisocyanate ("HDI"), 4,6-xylene diisocyanate, isophorone diisocyanate,("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate, sold as Tolonate® HDT from Rhodia Corporation and the trimer of isophorone diisocyanate are also suitable.

An isocyanate functional adduct can be used, such as, an adduct of an aliphatic polyisocyanate and a polyol or an adduct of an aliphatic polyisocyanate and an amine. Also, any of the aforementioned polyisocyanates can be used with a polyol to form an adduct. Polyols, such as, trimethylol alkanes, particularly, trimethylol propane or ethane can be used to form an adduct.

The novel composition can contain 1 to 50% by weight, preferably, 20 to 40% by weight, based on the weight of the binder, of acrylic NAD (non-aqueous dispersed) resins. These NAD resins typically are high molecular weight resins having a crosslinked acrylic core with a Tg between 20 to 100° C. and attached to the core are low Tg stabilizer segments. A description of such NAD resins is in Antonelli et al. U.S. Pat. No. 4,591,533, Antonelli et al. U.S. Pat. No. 5,010,140 and in Barsotti et al. U.S. Pat. No. 5,763,528. These patents are hereby incorporated by reference.

Typically, a catalyst is used in the novel composition to reduce curing time and temperature and allow curing of the coating at ambient temperatures. Typical catalysts include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

The novel composition optionally contains an aminofunctional silane crosslinking agent or curing agent usually in an amount of 0.1 to 20% by weight, based on the weight of the binder; preferably, 0.5 to 3.5% by weight, based on the weight of the binder, of silane is used. Typically useful aminofunctional silanes have the formula

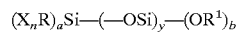

wherein X is selected from the group of —NH$_2$, —NHR$^2$, and SH, n is an integer from 1 to 5, R is a hydrocarbon group contain 1 to 22 carbon atoms, R$^1$ is an alkyl group containing 1 to 8 carbon atoms, a is at least 1, y is from 0 to 20, b is at least 2 and R$^2$ is an alkyl group having 1 to 4 carbon atoms.

Typically useful aminofunctional silanes are aminomethyltriethoxysilane, gamma-aminopropyltrimethoxysilane, gamma-aminopropyltriethoxysilane, gamma-aminopropylmethyldiethoxysilane, gamma-aminopropylethyldiethoxysilane, gamma-aminopropylphenyldiethoxyysilane, N-beta(aminoethyl) gamma-aminopropyltrimethoxysilane, delta-aminobutyltriethoxysilane, delta-aminobutylethyldiethoxysilane and diethylene triamino propylaminotrimethoxysilane. Preferred are N-beta (aminoethyl)gamma-aminopropyltrimethoxysilane, commercially sold as Silquest® A 1120, and diethylene triamino propylaminotrimethoxysilane that is commercially sold as Silquest® A 1130. Both of theses silanes are sold by OSi Specialties, Inc. Danbury, Conn.

When an amino silane crosslinking agent is used, additional amino functional curing agents, such as, primary, secondary and tertiary amines, that are well known in the art, are usually added. Typically, aliphatic amines containing a primary amine group, such as, diethylene triamine, and triethylene tetramine can be added. Tertiary amines, such as, tris-(dimethyl aminomethyl)-phenol can also be used.

The novel composition typically is solvent based and has a solids content of 40 to 80% by weight, preferably, 50 to 80% by weight and more preferably, 60 to 80% by weight of a ready to spray composition. The novel composition may be formulated at 100% solids by using a low molecular weight acrylic resin reactive diluent.

Any of the typical organic solvents may be used to form the coating composition. Such solvents include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and mixtures of any of the above.

Typically, the composition contains pigments in a pigment to binder weight ratio of 1/100 to 350/100. When the composition is used as a primer, conventional primer pigments are used in a pigment to binder weight ratio of 150/100 to 350/100. Typical of such pigments that are useful in primers are titanium dioxide, zinc phosphate, iron oxide, carbon black, amorphous silica, high surface area silica, barium sulfate, talc, chromate pigments for corrosion resistance, such as, calcium chromate, strontium chromate, zinc chromate, magnesium chromate, barium chromate and hollow glass spheres. If the coating composition is used as a base-coat or topcoat coating composition, inorganic and organic colored pigments, metallic flakes and powders, such as, aluminum flake and aluminum powders; special effects pigments, such as, coated mica flakes, coated aluminum flakes colored pigments may be used usually in combination with one of the aforementioned pigments.

If the novel coating composition is to be used as an exterior coating or as a coating that is subject to weathering and/or exposure to UV light, weatherability and UV durability of the coating can be improved by the addition of an ultraviolet light stabilizer or a combination of ultraviolet light stabilizers in the amount of 0.1% to 10% by weight, based on the weight of the binder. Such stabilizers include ultraviolet light absorbers, screeners, quenchers, and specified hindered amine light stabilizers. An antioxidant also can be added, in the amount of 0.1% to 5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in Antonelli et al. U.S. Pat. No. 4,591,533, the entire disclosure of which is incorporated herein by reference. For good durability, a blend of Tinuvin® 928 and Tinuvin® 123 (hindered amine light stabilizers), all commercially available from Ciba Specialty Chemicals, Tarrytown, N.Y. is preferred.

The novel coating composition may also include other conventional formulation additives, such as, wetting agents, leveling and flow control agents, for example, Resiflow®S (polybutylacrylate), BYK® 320 and 325 (high molecular weight polyacrylates), BYK® 347 (polyether-modified siloxane) and rheology control agents, such as, fumed silica.

The coating composition typically is a two component composition and the two components are mixed together shortly before application. The first component contains the acrylic resin and the polytrimethylene ether diol, the optional amino functional silane, the optional additional amine curing agent and pigments. The pigments are dispersed therein and optional solvents using conventional dispersing techniques, such as, ball milling, sand milling, attritor grinding, and the like. The second component contains the polyisocyanate crosslinking agent and solvent.

The coating composition can be applied by conventional techniques, such as, spraying, electrostatic spraying, dipping, brushing, and flow coating. Typically, the coating is applied to a dry film thickness of 50 to 300 microns and preferably, 75 to 200 microns, and more preferably, 100 to 130 microns. The coating can be cured at ambient temperatures and can be force cured at elevated temperatures of 50 to 150° C. to decrease the curing time.

Cured clear films of the novel coating composition (non-pigment containing films) have excellent elastic and hardness properties and the Tg of the cured film is greater than 50° C. which is surprising since the diol used in the composition has a Tg of −75° C. While not wishing to be bound by a theory, it is believed the acrylic polymer provides the hardness to the coating while the polytrimethylene ether diol segment provides improved flexibility and thus provides a coating with improved chip resistance and desired hardness that allows sandability in a relatively short time after application.

When pigmented and formulated into a primer and cured, the composition forms finishes having excellent flexibility, good adhesion to the original finish which may be sanded or to which a wash primer (thin primer layer) applied over the original finish, provides good filling of surface imperfections, can easily be sanded in a short time after application and curing and provides excellent stone chip resistance. In particular, the coating composition has a good cure response at ambient temperatures and excellent cure response at elevated temperature curing conditions.

Testing Procedures Used in the Examples

Dry Film Thickness—test Method ASTM D4138

Gravelometer—similar to test method ASTM D3170. A 90 degree panel angle is used, with panels and stones conditioned in a freezer held at −26° C. to —36° C. for a minimum of 2 hours prior to testing. One pint of such frozen stones is used in the test. Additionally, 3 pints of room-temperature stones are used on panels stored at room temperature to provide additional information. Panels are rated from 1 to 9 with 1 being the worst (very severe chipping) and 9 being the best (almost no chipping). Optionally, the area (in square millimeters) of the largest chip is also considered in assessing the performance of the coating.

Persoz Hardness Test—the change in film hardness of the coating was measured with respect to time after application by using a Persoz Hardness Tester Model No. 5854 [ASTM D4366] supplied by Byk-Mallinckrodt, Wallingford, Conn. The number of Oscillations [referred as Persoz No.] are recorded.

Hardness—was measured using a Fischerscope® Hardness Tester. [The measurement is in Newtons per square millimeter.]

Tg (glass transition temperature) of a polymer is determined according to ASTM D-3418 (1988).

Molecular weight and hydroxyl number of the polytrimethylene ether diol are determined according to ASTM E222.

Molecular weights Mw and Mn and the polydispersity (Mw/Mn) of the acrylic polymer and other polymers are determined by GPC (Gel Permeation Chromatography) using polystyrene standards and tetrahydrofuran as the solvent.

Percent strain to break and energy to break were obtained on a Model 1122 Instron electromechanical test machine modified for computer control and data reduction and maintained according the standards of ISO 9001. Test sample width was 12.7 mm and thickness was approximately 0.1 mm; the exact thickness was determined with a calibrated micrometer. The gage length was 12.7 mm and test speed was 5.0 mm/min. All results were obtained under ambient laboratory conditions.

The following examples illustrate the invention. All parts and percentages are on a weight basis unless otherwise indicated. Abbreviation "PBW" means parts by weight

EXAMPLES

Example 1

Preparation of (polytrimethylene ether diols A and B)

1,3-Propanediol (3.4 kg) and concentrated sulfuric acid (30.4 g) were placed in a 5 L three neck round bottom flask fitted with a nitrogen inlet, mechanical stirrer and a distillation head. Nitrogen gas was bubbled through the reaction mixture for 15 minutes. The polymerization was carried out at 160° C. with stirring under a nitrogen atmosphere. After collecting 525 g of water distillate in a receiving flask, the flask was connected to a vacuum pump and the pressure was slowly reduced to 1–5 mm Hg. The molecular weight of the resulting reaction product was monitored by analyzing the samples at different time intervals using an NMR end group analysis method. The polymerization was stopped after obtaining the desired molecular weight (approximately 2,000) and the polymer was purified as described below.

An equal volume of water was added to the crude polymer and the reaction mixture was refluxed at 100° C. for about 6 hours and a stirring speed of 180 rpm was used under a nitrogen atmosphere. After approximately 6 hours, the heater and the stirrer were turned off and the mixture was allowed to separate into two phases. The top aqueous phase was decanted and the polytrimethylene ether diol phase was washed further with distilled water three more times to extract out most of the acid and the oligomers that were formed. The residual acid left in the polytrimethylene ether diol was neutralized with excess lime. The polytrimethylene ether diol was dried at about 100° C. under reduced pressure for 2–3 hours and then the dried diol was filtered while hot through a Whatman filter paper precoated with a Celite® filter aid. The polytrimethylene ether diol was analyzed and the properties are listed in Table 1 below. A second polytrimethylene ether diol B was prepared as above and the properties are shown in Table 1.

TABLE 1

Properties of polytrimethylene ether diols A and B

| Polytrimethylene ether diol | A | B |
|---|---|---|
| Number Average Molecular Weight (Mn) | 1850 | 2738 |
| Hydroxyl Number | 60.6 | 41.0 |

Preparation of Primer Millbase Compositions A–C

Primer millbase compositions A, B, and C were prepared by charging the following ingredients into a mixing vessel:

| Primer Millbase Compositions Description of Material | A PBW | B PBW | C PBW |
|---|---|---|---|
| Portion 1 | | | |
| Butyl acetate | 130.90 | 84.38 | 52.17 |
| Xylene | 21.30 | 21.81 | 22.21 |
| Methyl amyl ketone | 23.20 | 23.81 | 24.25 |
| Methyl isobutyl ketone | 75.30 | 77.09 | 78.50 |
| Potytrimethylene ether diol B Mn 2738 (prepared above) | 75.70 | 38.75 | — |
| Ethylene oxide oligomer[1] | 0.0 | 48.44 | 98.64 |
| Hydroxy acrylic polymer[2] | 295.20 | 305.97 | — |
| Hydroxy acrylic polymer[3] | — | — | 307.9 |
| BYK-320 dispersion (Polysiloxane resin available from Byk Chemie) | 3.80 | 3.88 | 3.95 |
| Anti-Terra U (salt of a long chain polyamine-amide and high molecular weight ester) | 2.80 | 2.82 | 2.87 |
| Dibutyl tin diacetate (10% solution in xylene) | 1.70 | 1.89 | 2.07 |
| Benton ®-34 (dispersion of Bentone ® 34 from Elementis Specialties) | 76.60 | 78.44 | 79.87 |
| Portion 2 | | | |
| Talc N 503 (talc pigment) | 91.60 | 93.79 | 95.50 |
| Talc D30E (talc pigment) | 134.90 | 138.21 | 140.73 |
| ZEEOS G 200 (hollow glass beads from Eastech Chemical) | 337.40 | 345.57 | 351.88 |
| Portion 3 | | | |
| Blanc Fixe (barium sulfate pigment) | 119.90 | 122.75 | 124.99 |
| Titanium dioxide pigment | 106.10 | 108.70 | 110.69 |
| Carbon black pigment | 2.30 | 2.34 | 2.38 |
| Portion 4 | | | |
| Acetic acid | 1.30 | 1.38 | 1.40 |
| Total | 1500.00 | 1500.00 | 1500.00 |

[1]Ethylene oxide oligomer - reaction product of 1 mole of pentaerythritol, 4 moles of methyl hexahydrophthalic anhydride and 4 moles of ethylene oxide.
[2]Hydroxy acrylic polymer - acrylic polymer of 37 parts styrene, 17.5 parts isobornyl methacrylate, 25.5 parts hydroxyethyl methacrylate, 20 parts 2-ethylhexyl methacrylate having a Mw of 15,000 and a Tg of 68° C.
[3]Hydroxy acrylic polymer - acrylic polymer of 37 parts styrene, 23 parts hydroxyethyl acrylate, 40 parts 2-ethylhexyl methacrylate having a Mw of 15,000 and a Tg of 20° C.

Ethylene oxide oligomer[1]-reaction product of 1 mole of pentaerythritol, 4 moles of methyl hexahydrophthalic anhydride and 4 moles of ethylene oxide.

Hydroxy acrylic polymer[(2)]-acrylic polymer of 37 parts styrene, 17.5 parts isobornyl methacrylate, 25.5 parts hydroxyethyl methacrylate, 20 parts 2-ethylhexyl methacrylate having a Mw of 15,000 and a Tg of 68° C.

Hydroxy acrylic polymer[(3)]-acrylic polymer of 37 parts styrene, 23 parts hydroxyethyl acrylate, 40 parts 2-ethylhexyl methacrylate having a Mw of 15,000 and a Tg of 20° C.

In the preparation of each of the Primer Millbase Compositions A, B and C, Portion 1 was charged into the mixing vessel and stirred for 15 minutes. Portion 2 was premixed and slowly added to the mixing vessel with stirring and stirred for 30 minutes. Portion 3 was premixed and slowly added to the mixing vessel with stirring and stirred for 60 minutes. Portion 4 was added and stirred for 15 minutes and the resulting mixture was ground 3 passes in a top feed sand mill using glass media for 3 passes. Since Primer Millbase Composition C does not contain polytrimethylene ether diol, it is considered to be a comparative composition.

The resulting Primer Millbases A to C have the following properties:

| Primer Millbase | A | B | C |
| --- | --- | --- | --- |
| Weight % solids | 70.2 | 72.0 | 73.4 |
| Volume % solids | 49.8 | 51.6 | 53.3 |
| Pigment/Binder ratio | 312.85/100 | 309.71/100 | 309.7/100 |
| Pigment Vol. Concentration (%) | 53.7 | 54.2 | 54.0 |
| Gallon Weight (#/gal) | 12.09 | 12.36 | 12.49 |

Activated Primer Compositions A to C were prepared by blending the following ingredients together shortly before spray application:

| Activated Primer Comp. | A | B | C |
| --- | --- | --- | --- |
| Primer Mill Base | 166.40 | 161.95 | 157.69 |
| Reducer[(3)] | 18.80 | 18.32 | 17.84 |
| Activator[(4)] | 14.80 | 19.73 | 24.46 |
| Total | 200.00 | 200.00 | 200.00 |

[(3)]Reducer - 12375S-blend of hydrocarbon solvents commercially available from E. I. DuPont de Nemours and Company, Wilmington, Delaware.
[(4)]Activator - 12305S-Tolonate ® HDT trimer of hexamethylene diisocyanate (Rhodia Inc.) activator is commercially available from E. I. DuPont de Nemours and Company, Wilmington, Delaware.

The resulting Activated Primer Compositions A to C have the following properties:

| Activated Primer Comp. | A | B | C |
| --- | --- | --- | --- |
| NCO:OH ratio | 1.1:1.0 | 1.1:1.0 | 1.1:1.0 |
| Weight % solids | 62.92 | 64.46 | 65.50 |
| Volume % solids | 43.21 | 44.95 | 46.46 |
| Gallon Weight (#/gal) | 11.02 | 11.11 | 11.10 |
| VOC* (calculated #/gal) | 4.09 | 3.94 | 3.82 |

VOC volatile organic content.

The above prepared Activated Primer Compositions A to C were each applied by spraying onto separate cold rolled steel panels coated with about 0.3 to 0.6 mils (7.5 to 15 microns) of a commercial refinish wash primer (described below) and the Activated Primer Composition was cured at ambient temperature. After curing, the resulting dry film thickness of the primer composition was in the range of 4 to 7 mils (100 to 178 microns). The Persoz Hardness and the Fischer Hardness were measured for each of the panels and shown in Tables 2 and 3 below. Primer C panels were retested (Primer C did not contain the polytrimethylene ether diol).

TABLE 2

Persoz Hardness of Activated Primer Compositions A to C

| Primer | 3 Hours | 1 Day |
| --- | --- | --- |
| A | 30 | 66 |
| B | 30 | 51 |
| C | 34 | 36 |
| C (retest) | 34 | 36 |

TABLE 3

Fischer Hardness of Activated Primer Compositions A to C

| Primer | 1 day | 7 days | 18 days | 21 days |
| --- | --- | --- | --- | --- |
| A | 48 | 84 | 110 | 133 |
| B | 27 | 84 | 110 | 133 |
| C | 21 | 51 | 59 | 60 |
| C (retest) | 23 | 46 | 64 | 64 |

The above data in Tables 2 and 3 shows that Primer Compositions A and B that contained the polytrimethylene ether diol increased in hardness on curing whereas Primer Composition C, which did not contain the polytrimethylene ether diol, did not increase significantly in hardness on curing. Table 2 containing the Persoz Hardness data, shows that the Persoz Hardness approximately doubled from 3 hours to 24 hours after application for Primer Compositions A and B whereas the Persoz Hardness for Primer C only increased slightly. Table 3 containing Fischer Hardness data, shows that the hardness of Primer Compositions A and B is approximately double that of Primer Composition C after 18 and 21 days. Due to the similar hardness values at short times, sandability is expected to be similar for Primer Compositions A to C.

The commercial refinish wash primer utilized to prime the above steel panels is formulated by mixing Variprime® 615S (pigmented component) and Variprime® 616S (reducer component) in a 1/1 volume ratio (weight ratio of 120 g of 615S/80 g of 616S) to form a composition having a total solids content of 28.43%, binder solids of 8.39%, pigment to binder weight ratio of 239/100, VOC (#/gal) 5.891 and a gallon weight (#/gal) of 5.42. The binder of the primer is a combination of phenolic/polyvinyl butyral/nitrocellulose resin. The pigment portion of 615S contains zinc chromate pigment in the amount of 5.3% on the total formula composition by weight. The reducer (616S) contains phosphoric acid in the amount of 2.2% by weight based the total formula weight. 615S and 616S are commercial products available from E.I. DuPont de Nemours and Company, Wilmington, Del.

A set of panels primed with Primer Compositions A to C was prepared as above. The panels were allowed to cure overnight at about 24° C. and 50% relative humidity, and were then sanded with 400 grit sandpaper to give a film build of about 4.0 to 4.5 mils (102 to 114 microns). Each of the panels was coated with an un-activated blue metallic base coat—ChromaBase® Blue Metallic basecoat N 8112K (hydroxy functional acrylic polymer dispersion containing dispersed aluminum flake pigments, phthalocyanine blue pigment and carbon black pigment) and Chromasystems Basemaker 7175S (acrylic resin in organic solvents—available from E.I. DuPont de Nemours and Company, Wilmington, Del.). One part of N8112K is mixed with one part 7175S to form an unactivated base coat. Each panel was top coated with a clear top coat (DuPont ChromaClear® V-7500S two component urethane clear coat commercially available from E.I. DuPont de Nemours and Company, Wilmington, Del.).

Another panel was prepared as above with Primer Composition C and the blue metallic base coat was activated with ChromaPremier® 12305S isocyanate activator.

A second set of panels coated with Primer Composition A to C and prepared as described above was coated with an unactivated red base coat—ChromaBase® Red Basecoat B8713K (hydroxyfunctional acrylic polymer dispersion containing Monastral® Magenta pigment dispersion and Perrindo® red dispersion) and Chromasystems Basemaker 7175S (acrylic resin in organic solvents). One part of B8731 K was mixed with one part of 7175 S. Each of the panel was coated with a clear top-coat (described above).

Another panel was prepared as above with Primer Composition C except the base coat was activated with the ChromaPremier® 12305S isocyanate activator.

Each of the above prepared sets of panels was tested for chip resistance using the Gravelometer test as described above. The results are shown in Table 4 below.

TABLE 4

Gravelometer Test Results

| Gravelometer Test | 3 Pints Stones Room Temp. | 1 Pint Stones Frozen |
|---|---|---|
| Blue Metallic Base Coat | | |
| Primer A | 5 | 7 |
| Primer B | 3 | 5 |
| Primer C | 3 | 4 |
| Primer C with Activated Base Coat | 5 | 7 |
| Red Base Coat | | |
| Primer A | 5 | 6 |
| Primer B | 3 | 4 |
| Primer C | 1 | 2 |

TABLE 4-continued

Gravelometer Test Results

| Gravelometer Test | 3 Pints Stones Room Temp. | 1 Pint Stones Frozen |
|---|---|---|
| Primer C with Activated Base Coat | 6 | 6 |

The above data shows that for both the panels of the Blue Metallic Base Coat and the Red Base Coat, Primers A and B that contained polytrimethylene ether diol have a higher Gravelometer chip rating at room temperature and at a low temperature in comparison to Primer C that did not contain polytrimethylene ether diol. In both cases, the blue metallic and the red activated base coats in combination with Primer C did not significantly increase the chip resistance in comparison to Primer A that contained the polytrimethylene ether diol. Normally, an activated base coat increases chip resistance. Primer B shows some improvement as compared to Primer C used with an un-activated basecoat. This shows that the addition of polytrimethylene ether diol in combination with an ethylene oxide oligomer improves chip performance in comparison to the use of only ethylene oxide oligomer in Primer C.

Example 2

The following clear coating compositions D, E, and F were prepared by charging the following ingredients into a mixing vessel and thoroughly mixing the ingredients:

| Clear Coating Compositions Description of Material | D PBW | E PBW | F PBW |
|---|---|---|---|
| Hydroxy acrylic polymer[3] | — | — | 90.0 |
| Hydroxy acrylic polymer[2] | 90 | 90 | — |
| Polytrimethylene ether diol Mn 1810 | 23 | — | — |
| Ethylene oxide oligomer[1] | — | 28.8 | 29.2 |
| Dibutyl tin dilaurate (10% solution in xylene) | 0.21 | 0.24 | 0.24 |
| Butyl acetate | 30.5 | 34.8 | 35.7 |
| Xylene | 23.5 | 24.0 | 24.7 |
| Methyl amyl ketone | 30.5 | 34.8 | 35.7 |
| Byk-333 from Byk-Chemie | 0.06 | 0.07 | 0.07 |
| Activator[4] | 34.9 | 53.9 | 54.9 |
| Total | 232.67 | 266.61 | 270.5 |

[2]Hydroxy acrylic polymer - described in Example 1.
[3]Hydroxy acrylic polymer - described in Example 1.
[1]Ethylene oxide oligomer - described in Example 1.
[4]Activator - described in Example 1.

The above prepared Clear Coating Compositions D to F were each applied with a draw-down bar over electrocoated steel panels to give a dry film thickness of 2 mils (51 microns) and the resulting clear coating compositions were cured at an ambient temperature of about 24° C. The Persoz Hardness and the Fischer Hardness were measured for each of the panels at different times and the data is shown in Tables 5 and 6 below. The Tg, % Strain to Break, and Energy to Break were measured for each of the clear coating compositions after curing for 30 days at about 24° C. and 50% relative humidity and the results are shown in Table 7 below.

TABLE 5

Persoz Hardness of Clear Coating Compositions D to F

| Clear Coating | 3 Hours | 1 Day |
|---|---|---|
| D | 10 | 78 |
| E | 17 | 175 |
| F | 4 | 60 |

TABLE 6

Fischer Hardness Clear Coating Compositions D to F

| Clear Coating | 1 day | 7 days | 14 days | 21 days |
|---|---|---|---|---|
| D | 24.5 | 102 | 104 | 109 |
| E | 55 | 145 | 151 | 156 |
| F | 8.6 | 124 | 135 | 136 |

TABLE 7

Tg, % Strain at Break and Energy to Break Clear Coatings D to F

| Clear Coating | Tg | % Strain to Break | Energy to Break (mi/sq. mm) |
|---|---|---|---|
| D | 60.3 | 52.6 | 112.4 |
| E | 63.7 | 7.0 | 32.8 |
| F | 58.0 | 6.6 | 31.2 |

Clear Coating Composition F is a comparative composition that was formulated with a low Tg acrylic polymer (Tg 20° C.). Clear Coating Composition E is a comparative composition that was formulated with a high Tg acrylic polymer (Tg 68° C.). Clear Coating Composition D is a preferred composition of the invention and was also formulated with the same high Tg acrylic polymer. Clear Coating Composition D has acceptable hardness values (Persoz and Fischer) but significantly higher % Strain to Break and Energy to Break which typically translates into a more durable clear coating composition that is useful on automobiles and truck in comparison to Clear Coating Compositions E and F. Clear Coating Composition E that used the same high Tg acrylic polymer as Clear Coating Composition D but did not use the polytrimethylene ether diol but rather a ethylene oxide oligomer had high hardness but significantly lower % Strain to Break and Energy to Break in comparison to Clear Coating Composition D which represents the invention. Similarly, Clear Coating Composition F that used the low Tg acrylic polymer and the ethylene oxide oligomer had significantly lower % Strain to Break and Energy to Break in comparison to Clear Coating Composition D which represents the invention.

Example 3

The following clear coating compositions G through K were prepared by charging the following ingredients into a mixing vessel and thoroughly mixing the ingredients:

| Clear Coating Compositions Description of Material | G PBW | H PBW | I PBW | J PBW | K PBW |
|---|---|---|---|---|---|
| Hydroxy acrylic polymer[2] | 58.7 | 58.6 | 58.0 | 50.5 | 68.7 |
| Polytrimethylene ether diol Mn 2753 | 15.1 | — | — | — | — |
| PPG 2000[5] | — | 15.0 | — | — | — |
| Terathane ® 2000[6] | — | — | 14.9 | — | — |
| S Diol[7] | — | — | — | 12.9 | 2.2 |
| Dibutyl tin diacetate (10% solution in xylene) | 0.3 | 0.3 | 0.3 | .03 | .03 |
| Activator[4] | 25.9 | 26.1 | 26.9 | 36.3 | 28.8 |
| Total | 100.0 | 100.0 | 100.0 | 100.0 | 100.0 |

[2]Hydroxy acrylic polymer[2] - described in Example 1.
[5]PPG 2000 - Polypropylene glycol having a molecular weight of 2000 from Aldrich Chemical Company (product no. 81380).
[6]Terathane ® 2000 polyether glycol having a molecular weight of 2023 from E. I. DuPont de Nemours and Company.
[7]S Diol - hydroxy oligomer (reaction product of 3 moles of caprolactone and 1 mole of 1,4-cyclohexane dimethanol).
[4]Activator - described in Example 1.

The above prepared Clear Coating Compositions G to K were each applied with a draw-down bar on electrocoated steel panels. The clear coating compositions were cured at an ambient temperature of about 24° C. The resulting dry film thickness of each of the clear coating compositions was in the range of 1.8 to 2.2 mils (46 to 56 microns).

The Gel Fraction and Tg of each of the clear films after 30 days curing at about 24° C. and 50% relative humidity were measured and the results shown in Table 8 following.

TABLE 8

Gel Fraction and Tg (Glass Transition Temperature) Clear Coating Films G to K

| Clear Coating | Gel Fraction | Tg |
|---|---|---|
| G | 97.80% | 64.2 |
| H | 89.90% | 61.4 |
| I | 98.10% | 58.5 |
| J | 93.40% | 33.1 |
| K | 93.00% | 59.8 |

The Glass Transition Temperatures (Tg) of the Clear Coating Films G–I and K were very similar. Clear Coating J had a relatively low Tg in comparison to the other Clear Coatings. The relatively large amount of soluble material in Clear Coating Film H indicates that this film should have poorer long term outdoor durability in comparison Clear Coatings G and I. Clear Coatings J and K have more soluble material than Clear Coatings G and I and are also expected not to have as good long term outdoor durability as Clear Coatings G and I.

Example 4

Preparation of Primer Millbase Compositions L to P

Primer millbase compositions L to P were prepared by charging the following ingredients into a mixing vessel:

| Primer Millbase Compositions Description of Material | L PBW | M PBW | N PBW | O PBW | P PBW |
|---|---|---|---|---|---|
| Portion 1 | | | | | |
| Butyl acetate | 131.0 | 131.0 | 131.0 | 130.9 | 127.3 |
| Xylene | 21.3 | 21.3 | 21.3 | 21.3 | 20.7 |
| Methyl amyl ketone | 23.3 | 23.3 | 23.3 | 23.2 | 22.5 |
| Methyl isobutyl ketone | 75.3 | 75.3 | 75.3 | 75.2 | 73.2 |
| Polytrimethylene ether diol Mn 2753 | 75.7 | — | — | — | — |
| PPG 2000(5) described in Example 3 | — | 75.7 | — | — | — |
| Terathane ® 2000(6) described in Example 3 | — | — | 75.7 | — | — |
| S Diol(7) described in Ex. 3 | — | — | — | 75.7 | 12.3 |
| Hydroxy acrylic polymer(2) described in Ex. 1 | 295.3 | 295.3 | 295.3 | 295.2 | 389.6 |
| BYK-320 dispersion (Polysiloxane resin available from Byk Chemie) | 3.8 | 3.8 | 3.8 | 3.7 | 3.7 |
| Anti-Terra U (salt of a long chain polyamine-amide and high molecular weight ester) | 2.8 | 2.8 | 2.8 | 2.8 | 2.7 |
| Dibutyl tin diacetate (10% solution in xylene) | 1.7 | 1.7 | 1.7 | 1.9 | 1.7 |
| Benton ®-34 (dispersion of Benton ® 34 from Elementis Specialties) | 76.6 | 76.6 | 76.6 | 76.6 | 74.5 |
| Portion 2 | | | | | |
| Talc N 503 (talc pigment) | 91.6 | 91.6 | 91.6 | 91.6 | 89.0 |
| Talc D30E (talc pigment) | 134.9 | 134.9 | 134.9 | 134.9 | 131.3 |
| ZEEOS G 200 (hollow glass beads from Eastech Chemical) | 337.4 | 337.4 | 337.4 | 337.4 | 328.1 |
| Portion 3 | | | | | |
| Blanc Fixe (barium sulfate pigment) | 119.9 | 119.9 | 119.9 | 119.8 | 116.6 |
| Titanium dioxide pigment | 106.1 | 106.1 | 106.1 | 106.1 | 103.2 |
| Carbon black pigment | 2.3 | 2.3 | 2.3 | 2.2 | 2.3 |
| Portion 4 | | | | | |
| Acetic acid | 1.4 | 1.4 | 1.4 | 1.3 | 1.3 |
| Total | 1500 | 1500 | 1500 | 1500 | 1500 |

In the preparation of each of the Primer Millbase Compositions L to P, Portion 1 was charged into the mixing vessel and stirred for 15 minutes. Portion 2 was premixed and slowly added to the mixing vessel with stirring and stirred for 30 minutes. Portion 3 was premixed and slowly added to the mixing vessel with stirring and stirred for 60 minutes. Portion 4 was added and stirred for 15 minutes and the resulting mixture was ground 3 passes in a top feed sand mill using glass media for 3 passes. Since Primer Millbase Compositions M to P do not contain polytrimethylene ether diol, they are considered to be comparative compositions.

The resulting Primer Millbases L to P have the following properties:

Activated Primer Compositions L to P were prepared by blending the following ingredients together shortly before spray application:

| Activated Primer Comp. | L | M | N | O | P |
|---|---|---|---|---|---|
| Primer Mill Base | 250 | 249.8 | 249.1 | 159.4 | 163.3 |
| Reducer(3) | 28.3 | 28.3 | 28.2 | 18.0 | 18.5 |
| Activator(4) | 21.7 | 21.9 | 22.7 | 22.5 | 17.9 |
| Total | 300.0 | 300.0 | 300.0 | 199.9 | 199.7 |

(3)Reducer - described in Example 1.
(4)Activator - described in Example 1

| Primer Millbase | L | M | N | O | P |
|---|---|---|---|---|---|
| Weight % solids | 69.9 | 69.9 | 69.9 | 69.9 | 67.8 |
| Volume % solids | 49.1 | 49.1 | 52.7 | 48.9 | 46.3 |
| Pigment/Binder ratio | 318.5/100 | 318.5/100 | 318.5/100 | 318.5/100 | 321.7/100 |
| Pigment Vol. Concentration (%) | 54.61 | 54.47 | 47.2 | 55.01 | 55.58 |
| Gallon Weight (#/gal) | 12.13 | 12.13 | 11.26 | 12.17 | 11.98 |

The resulting Activated Primer Compositions L to P have the following properties:

| Activated Primer Composition | L | M | N | O | P |
|---|---|---|---|---|---|
| NCO:OH ratio | 1.12:1.0 | 1.12:1.0 | 1.12:1.0 | 1.12:1.0 | 1.12:1.0 |
| Weight % solids | 62.6 | 62.6 | 62.6 | 62.7 | 61.0 |
| Volume % solids | 42.6 | 42.7 | 41.7 | 43.3 | 41.0 |
| Gallon Weight (#/gal) | 11.0 | 11.1 | 10.4 | 10.9 | 10.9 |
| VOC* (calculated #/gal) | 4.1 | 4.09 | 3.9 | 4.06 | 4.04 |

VOC volatile organic content.

The above prepared Activated Primer Compositions L to P were each applied by spraying onto separate cold rolled steel panels coated with about 0.3 to 0.6 mils (7.5 to 15 microns) of a commercial refinish wash primer (described in Example 1) and the Activated Primer Composition was cured at ambient temperature. The resulting dry film thickness of the primer composition was in the range of 4 to 7 mils (100 to 178 microns). The Persoz Hardness and the Fischer Hardness were measured for each of the panels and shown in Tables 9 and 10 below.

TABLE 9

Persoz Hardness of Activated Primer Compositions L to P

| Primer | 3 Hours | 1 Day |
|---|---|---|
| L | 34 | 86 |
| M | 39 | 93 |
| N | 41 | 85 |
| O | 35 | 46 |
| P | 30 | 61 |

TABLE 10

Fischer Hardness of Activated Primer Compositions L to P

| Primer | 1 day | 7 days |
|---|---|---|
| L | 74 | 105 |
| M | 100 | 117 |
| N | 68 | 123 |
| O | 30.4 | 61 |
| P | 47 | 157 |

The above data in Table 9 shows that Primer Compositions L to P have about the same Peroz Hardness after 3 hours but after one day Primers L to N have a significant higher level of hardness in comparison to Primers O and P that contained Diol and did not contain the polytrimethylene ether diol. The above data in Table 10 shows that Primer Compositions L to N have relatively high hardness values after 1 day in comparison to Prime Compositions O and P that contained S Diol and did not contain the polytrimethylene ether diol. After 7 days, Primer Composition O that contained S Diol had significantly lower hardness value comparison to the Primer Compositions L, M, N, and P.

A set of panels primed with Primer Compositions L to P was prepared as above, The panels were allowed to cure overnight at about 25° C. and 50% relative humidity and were then sanded with 400 grit sandpaper and the resulting film build was about 4.0 to 4.5 mils (102 to 114 microns). Each of the panels was coated with an un-activated red metallic base coat (described in Example 1). Each panel was top coated with a clear top coat (DuPont ChromaClear® V-7500S described in Example 1) and cured.

Each of the above prepared panels was tested for chip resistance using the Gravelometer test as described above. The results are shown in Table 11 below.

TABLE 11

Gravelometer Test Results

| Gravelometer Test | 3 Pints Stones Room Temp. | 1 Pint Stones Frozen | Size of Largest Chip |
|---|---|---|---|
| Red Metallic Base Coat | | | |
| Primer L | 5 | 6 | 7.5 sq. mm |
| Primer M | 5 | 6 | 10 sq. mm |
| Primer N | 5 | 6 | 15 sq. mm |
| Primer O | 2 | 2 | Not rated |
| Primer P | 2 | 2 | Not rated |

Primer L, the invention, Primer M and Primer N have similar Gravelometer Chip ratings whereas Primers O and P have very low and unacceptable Gravelometer Chip ratings. The size of the largest chip is also a consideration. Primer L, the invention, has the smallest size chips and is considered to have the best performance in comparison to Primers M and N that had noticeably larger chip sizes. Primers O and P were not rated for chip size since the Gravelometer Chip ratings were poor.

What is claimed is:

1. A coating composition comprising a film forming binder comprising
   a. an acrylic polymer having pendant groups that are reactive with isocyanate moieties and having a glass transition temperature (Tg) of 10 to 80° C.;
   b. a polytrimethylene ether diol having a Mn (number average molecular weight) of 500 to 5,000; and
   c. an organic polyisocyanate crosslinking agent.

2. The coating composition of claim 1 containing up to 60% by weight of solvent.

3. The coating composition of claim 2 wherein the polytrimethylene ether diol has a Mn 500 to 5,000, a Tg of approximately −75° C. and a hydroxyl number of 20 to 200.

4. The coating composition of claim 2 wherein the polytrimethylene ether diol is a blend of high and low molecular weight ether diols wherein the high molecular weight diol has an Mn of 1,000 to 4,000 and the low molecular weight diol has an Mn of 150 to 500 and the average Mn of the blend is 1,000 to 3,000.

5. The coating composition of claim 2 wherein the acrylic polymer has a weight average molecular weight of 5,000 to 50,000 and a Tg of 10° C. to 80° C. and consists essentially of polymerized monomers selected from the group consisting of linear alkyl(meth)acrylates having 1–12 carbon atoms in the alkyl group, cyclic or branched alkyl(meth)acrylates having 3 to 12 carbon atoms in the alkyl group, isobornyl (meth)acrylate, styrene, alpha methyl styrene, (meth)acrylonitrile, (meth)acryl amides, and polymerized monomers that provide groups reactive with isocyanate selected from the group consisting of hydroxy alkyl(meth)acrylates having 1 to 4 carbon atoms in the alkyl group, glycidyl (meth)acrylates, hydroxy amino alkyl(meth)acrylates having 1 to 4 carbon atoms in the alkyl group, alkoxy silyl alkyl(meth)acrylate and (meth)acrylic acid.

6. The coating composition of claim 5 wherein the acrylic polymer has a hydroxyl equivalent weight of 300 to 800 and consists essentially of polymerized monomers selected from the group consisting of alkyl(meth)acrylates having 1 to 12 carbon atoms in the alkyl group, isobornyl methacrylate styrene, alpha methyl styrene, (meth)acrylonitrile, (meth)acryl amides, and polymerized monomers consisting of hydroxy alkyl(meth)acrylates having 1 to 4 carbon atoms in the alkyl group.

7. The coating composition of claim 5 wherein the acrylic polymer consists essentially of styrene, ethylhexyl methacrylate, isobornyl methacrylate and hydroxyethyl methacrylate.

8. The coating composition of claim 1 wherein the polyisocyanate is selected from the group consisting of aliphatic polyisocyanates, cycloaliphatic polyisocyanates, aromatic polyisocyanates, trifunctional isocyanates and isocyanate adducts.

9. The coating composition of claim 1 in which the polyisocyanate is selected from the group consisting of isophorone diisocyanate, toluene diisocyanate, hexamethylene diisocyanate, diphenylmethane diisocyanate, triphenyl triisocyanate, benzene triisocyanate, toluene triisocyanate and the trimer of hexamethylene diisocyanate.

10. The coating composition of claim 1 wherein the binder comprises
    a. 10 to 80% by weight, based on the weight of the binder, of the acrylic polymer;
    b. 1 to 50% by weight, based on the weight of the binder of polytrimethylene ether diol; and
    c. 10 to 50% by weight, based on the weight of the binder, of an organic polyisocyanate crosslinking agent.

11. The coating composition of claim 1 containing 0.1 to 20% by weight, based on the weight of the binder of an aminofunctional silane crosslinking agent having the formula

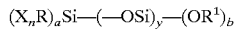

wherein X is selected from the group consisting of —NH$_2$, —NHR$^2$, and SH, n is an integer from 1 to 5, R is a hydrocarbon group contain 1 to 22 carbon atoms, R$^1$ is an alkyl group containing 1 to 8 carbon atoms, a is at least 1, y is from 0 to 20, b is at least 2 and R$^2$ is an alkyl group having 1 to 4 carbon atoms.

12. The coating composition of claim 11 wherein the aminofunctional silane is selected from the group consisting of N-beta-(aminoethyl)-gamma-aminopropyl trimethoxy silane and diethylene triamino propylaminotrimethoxy silane.

13. The coating composition of claim 11 containing an at least one additional amino functional compound selected from the group consisting of primary amines, secondary amines and tertiary amines.

14. The coating composition of claim 2 containing pigments in a pigment to binder weight ratio of 1/100 to 300/100.

15. The coating composition of claim 14 wherein the pigments are selected from the group consisting of titanium dioxide, iron oxide, silica, carbon black, baryte, zinc oxide, aluminum silicate, barium sulfate, zinc phosphate, lead silicate, clay, talc, hollow glass spheres and any mixtures thereof.

16. The coating composition of claim 1 comprising in addition to the polytrimethylene ether diol, a branched or linear oligomer.

17. The coating composition of claim 1 wherein the polytrimethylene ether diol is formed from a bio-derived 1,3-proandiol.

18. A coating composition comprising a film forming binder of
    a. an acrylic polymer having pendant groups that are reactive with isocyanate moieties and having a glass transition temperature (Tg) of 10 to 80° C.,
    b. a copolymer of polytrimethylene ether diol having a Mn (number average molecular weight) of 500 to 5,000 comprising at least 50% by weight, based on the weight of the diol of polymerized 1,3-propane diol and up to 50% by weight, based on the weight of the diol of another polymerized alkane diol; and
    c. an organic polyisocyanate crosslinking agent.

19. The coating composition of claim 18 containing up to 60% by weight of solvent.

20. The coating composition of claim 18 wherein the copolymer of polytrimethylene ether diol has a Mn 500 to 5,000, a Tg of approximately −75° C. and a hydroxyl number of 20 to 200.

21. The coating composition of claim 18 wherein the copolymer of polytrimethylene ether diol is a blend of high and low molecular weight ether diols wherein the high molecular weight diol has an Mn of 1,000 to 4,000 and the low molecular weight diol has an Mn of 150 to 500 and the average Mn of the blend is 1,000 to 3,000.

22. The coating composition of claim 18 wherein the acrylic polymer has a weight average molecular weight of 5,000 to 50,000 and a Tg of greater than 10° C. to 80° C. and consists essentially of polymerized monomers selected from the group consisting of linear alkyl(meth)acrylates having 1 to 12 carbon atoms in the alkyl group, cyclic or branched alkyl(meth)acrylates having 3 to 12 carbon atoms in the alkyl group, isobornyl(meth)acrylate, styrene, alpha methyl styrene, (meth)acrylonitrile, (meth)acryl amides, and polymerized monomers that provide groups reactive with isocyanate selected from the group consisting of hydroxy alkyl (meth)acrylates having 1 to 4 carbon atoms in the alkyl group, glycidyl(meth)acrylates, hydroxy amino alkyl(meth) acrylates having 1–4 carbon atoms in the alkyl group, alkoxy silyl alkyl(meth)acrylate and (meth)acrylic acid.

23. The coating composition of claim 22 wherein the acrylic polymer has a hydroxyl equivalent weight of 300 to 800 and consists essentially of polymerized monomers selected from the group consisting of alkyl(meth)acrylates having 1 to 12 carbon atoms in the alkyl group, isobornyl methacrylate styrene, alpha methyl styrene, (meth) acrylonitrile, (meth)acryl amides, and polymerized monomers consisting of hydroxy alkyl(meth)acrylates having 1 to 4 carbon atoms in the alkyl group.

24. The coating composition of claim 23 wherein the acrylic polymer consists essentially of styrene, ethylhexyl methacrylate, isobornyl methacrylate and hydroxyethyl methacrylate.

25. The coating composition of claim 18 wherein the polyisocyanate is selected from the group consisting of aliphatic polyisocyanates, cycloaliphatic polyisocyanates, aromatic polyisocyanates, trifunctional isocyanates and isocyanate adducts.

26. A coated substrate which comprises a substrate coated with a layer of the coating composition of claim 1.

27. The coated substrate of claim 26 wherein the substrate is selected from the group consisting of steel and aluminum.

28. The coated substrate of claim 26 comprising a top coating selected from the group consisting of a clear coat/pigmented base coat and a pigmented topcoat.

29. A two component coating composition comprising

Component A an acrylic polymer having pendant groups that are reactive with isocyanate moieties and having a glass transition temperature (Tg) of 10 to 80° C.; and a polytrimethylene ether diol having a Mn (number average molecular weight) of 500 to 5,000; and Component B an organic polyisocyanate crosslinking agent;

wherein Components A and B are thoroughly mixed together before application to a substrate.

30. A process which comprises applying a first layer of the composition of claim 1 to a substrate and drying said layer and applying at least on additional layer of a coating composition to the first layer and curing the layers.

31. The process of claim 30 wherein the at least one additional layer comprises a pigmented color coat and a clear coat.

32. A process which comprises applying a first layer of the composition of claim 18 to a substrate and drying said layer and applying at least on additional layer of a coating composition to the first layer and curing the layers.

33. The process of claim 32 wherein the at least one additional layer comprises a pigmented color coat and a clear coat.

34. A process for refinishing a damaged coating on a motor vehicle body which comprises applying a layer of the pigmented coating composition of claim 14 to damaged coating and at least partially curing the layer and then applying a second layer of a pigmented top coat or a layer of a pigmented base coat and a layer of a clear coat and curing all of the layers to form a finish.

* * * * *